US010160273B2

(12) United States Patent
Thompson et al.

(10) Patent No.: US 10,160,273 B2
(45) Date of Patent: Dec. 25, 2018

(54) TWO-POINT HITCH MOUNT SYSTEMS

(71) Applicant: Vermeer Manufacturing Company, Pella, IA (US)

(72) Inventors: Kent L. Thompson, Otley, IA (US); Derek DeMott, Maryville, MO (US)

(73) Assignee: Vermeer Manufacturing Company, Pella, IA (US)

( * ) Notice: Subject to any disclaimer, the term of this patent is extended or adjusted under 35 U.S.C. 154(b) by 0 days.

(21) Appl. No.: 15/415,601

(22) Filed: Jan. 25, 2017

(65) Prior Publication Data

US 2017/0246924 A1    Aug. 31, 2017

Related U.S. Application Data

(60) Provisional application No. 62/300,481, filed on Feb. 26, 2016, provisional application No. 62/338,553, filed on May 19, 2016.

(51) Int. Cl.
*B60D 1/00* (2006.01)
*B60D 1/02* (2006.01)
*B60D 1/04* (2006.01)
*B60D 1/145* (2006.01)
*B60D 1/46* (2006.01)
*A01B 59/042* (2006.01)
*B60D 1/14* (2006.01)
*B60D 1/44* (2006.01)

(52) U.S. Cl.
CPC ............ *B60D 1/025* (2013.01); *A01B 59/042* (2013.01); *B60D 1/04* (2013.01); *B60D 1/141* (2013.01); *B60D 1/145* (2013.01); *B60D 1/44* (2013.01); *B60D 1/46* (2013.01); *B60D 2001/008* (2013.01)

(58) Field of Classification Search
CPC .......... B60D 1/025; B60D 1/04; B60D 1/145; B60D 1/46
See application file for complete search history.

(56) References Cited

U.S. PATENT DOCUMENTS

| 2,252,691 A | 8/1941 | Ardnt |
| 2,346,330 A | 4/1944 | Ratcliff |
| 2,411,009 A | 11/1946 | Slimp |
| 3,716,253 A * | 2/1973 | Gniffke ............... A01B 59/043 |
| | | 172/248 |
| 3,724,875 A | 4/1973 | Hillman |

(Continued)

FOREIGN PATENT DOCUMENTS

| GB | 723987 A | 2/1955 |
| GB | 2424637 A | 10/2006 |

OTHER PUBLICATIONS http://www.chaselinks.com/Super_C.html, 1952 Farmall Super C, available before Feb. 26, 2016.

(Continued)

*Primary Examiner* — Joseph M Rocca
*Assistant Examiner* — Michael R Stabley
(74) *Attorney, Agent, or Firm* — Armstrong Teasdale LLP

(57) ABSTRACT

Two-point hitch mount systems for connecting an implement to a tow vehicle having two hitch arms are disclosed. The hitch mount systems may include a shaft configured to be attached to the two hitch arms of the tow vehicle and a yoke assembly. The yoke assembly includes a first and second shaft slots for removably receiving the shaft.

19 Claims, 16 Drawing Sheets

(56) References Cited

U.S. PATENT DOCUMENTS

| | | | |
|---|---|---|---|
| 3,760,883 A | 9/1973 | Birk | |
| 3,795,415 A * | 3/1974 | Koch | A01B 59/042 172/439 |
| 3,810,434 A * | 5/1974 | van der Lely | A01B 49/065 111/133 |
| 3,827,724 A | 8/1974 | Ackley | |
| 3,829,128 A * | 8/1974 | Sutton | A01B 59/062 172/272 |
| 3,837,674 A | 9/1974 | Rathsack | |
| 3,847,415 A | 11/1974 | Geisthoff | |
| 3,871,463 A | 3/1975 | Geisthoff | |
| 3,961,677 A | 6/1976 | Geisthoff | |
| 4,002,353 A | 1/1977 | Sysyn | |
| 4,073,346 A | 2/1978 | Groth et al. | |
| 4,077,476 A * | 3/1978 | van der Lely | A01B 33/065 172/49.5 |
| 4,113,026 A * | 9/1978 | van der Lely | A01B 33/065 172/49.5 |
| 4,202,562 A | 5/1980 | Sorenson | |
| 4,236,329 A * | 12/1980 | Hetrick | E01H 5/06 172/273 |
| 4,340,240 A | 7/1982 | Anderson | |
| 4,375,837 A * | 3/1983 | van der Lely | A01B 29/048 172/481 |
| 4,433,735 A * | 2/1984 | Clark | A01B 51/04 172/248 |
| 4,484,759 A | 11/1984 | Zwick | |
| 4,697,404 A | 10/1987 | Brockmeier et al. | |
| 4,962,945 A | 10/1990 | Vannoy et al. | |
| 5,261,687 A | 11/1993 | Bergman | |
| 5,263,810 A | 11/1993 | Takekata et al. | |
| 5,419,673 A | 5/1995 | Merhar | |
| 5,454,582 A | 10/1995 | Rines | |
| 5,582,255 A * | 12/1996 | Nikkel | A01B 63/102 172/26 |
| 5,664,632 A * | 9/1997 | Frasier | A01B 59/062 172/26 |
| 5,722,677 A | 3/1998 | Lichter et al. | |
| 5,816,339 A | 10/1998 | Parsons et al. | |
| 5,887,885 A | 3/1999 | Byers et al. | |
| 5,997,025 A | 12/1999 | Wisecarver | |
| 6,109,042 A | 8/2000 | Schuettenberg | |
| 6,139,043 A | 10/2000 | Gries et al. | |
| 6,145,222 A * | 11/2000 | Curtis | E01H 5/06 37/231 |
| 6,209,231 B1 * | 4/2001 | Curtis | E01H 5/06 37/231 |
| 6,312,004 B1 | 11/2001 | Kiss | |
| 6,470,660 B1 | 10/2002 | Buss et al. | |
| 6,478,094 B2 * | 11/2002 | Alexander | A01B 59/006 172/272 |
| 6,758,285 B2 * | 7/2004 | Ollefs | B60D 1/141 172/439 |
| 6,764,270 B1 * | 7/2004 | Bernhardt | A01B 51/026 414/685 |
| 6,893,039 B2 | 5/2005 | Scharmuller | |
| 6,962,210 B1 | 11/2005 | Redenius | |
| 7,011,330 B2 | 3/2006 | Blanton | |
| 7,059,419 B2 | 6/2006 | Greenwell | |
| 7,125,033 B2 * | 10/2006 | Forrister | B60D 1/06 280/416.2 |
| 7,178,605 B2 | 2/2007 | Williams et al. | |
| 7,182,146 B2 | 2/2007 | Erickson et al. | |
| 7,308,947 B2 | 12/2007 | Barnett | |
| 7,364,181 B2 | 4/2008 | Patterson | |
| 7,434,826 B1 | 10/2008 | Lambros | |
| 7,461,702 B2 * | 12/2008 | Farnsworth | A01B 59/066 172/439 |
| 7,487,843 B2 * | 2/2009 | Tuttle | A01B 59/062 172/272 |
| 7,526,883 B2 * | 5/2009 | Musso, Jr. | E01H 5/06 172/275 |
| 7,690,669 B2 * | 4/2010 | Johnson | B60D 1/07 172/248 |
| 8,033,562 B2 | 10/2011 | Morehead | |
| 8,033,563 B2 | 10/2011 | Good | |
| 8,046,938 B1 | 11/2011 | Jorgenson et al. | |
| 8,210,557 B2 | 7/2012 | Schneider | |
| 8,371,599 B2 | 2/2013 | Duvall et al. | |
| 8,444,169 B1 | 5/2013 | Katz | |
| 8,925,955 B2 | 1/2015 | Dekarske | |
| 9,193,231 B2 | 3/2015 | Bergum et al. | |
| 9,114,677 B2 | 8/2015 | Schuettenberg | |
| 2003/0019643 A1 * | 1/2003 | Pyle | A01B 59/043 172/439 |
| 2007/0108731 A1 | 5/2007 | McBroom | |
| 2007/0187118 A1 | 8/2007 | Belanger | |
| 2008/0157504 A1 | 7/2008 | Schuettenberg | |
| 2008/0197606 A1 | 8/2008 | Capuano | |
| 2009/0072514 A1 | 3/2009 | Hyslop | |
| 2009/0072516 A1 | 3/2009 | Kuenzel | |
| 2009/0115162 A1 | 5/2009 | Lybrook | |
| 2011/0115196 A1 | 5/2011 | Wulff | |
| 2011/0221167 A1 | 9/2011 | Merten et al. | |
| 2013/0160268 A1 | 6/2013 | Parker et al. | |
| 2014/0151077 A1 | 6/2014 | Rollenhagen | |
| 2014/0319802 A1 | 10/2014 | McCoy et al. | |
| 2015/0093227 A1 | 4/2015 | Faivre | |
| 2015/0097355 A1 | 4/2015 | Kraai | |
| 2015/0201544 A1 | 7/2015 | Wick | |
| 2015/0230388 A1 | 8/2015 | Ribo et al. | |
| 2015/0266348 A1 | 9/2015 | Hauler | |

OTHER PUBLICATIONS http://discussions.texasbowhunter.com/forums/showthread.php?t=479436, 3 point "Quick Hitch" questions, published Sep. 8, 2014.

http://www.palletforks.com/quick-hitch-tractor-implement-fast-ez.html, Quick Hitch Tractor Implement Fast EZ, available before Feb. 26, 2016.

http://www.pats3pointhitchsystem.com/page/7229, Pat's Easy Change 3 Point Hitch System, available before Feb. 26, 2016.

https://www.amazon.com/DuraSafe-Coupler-Connect-Trailer-Alignment/dp/B004VWETFU, available before Feb. 26, 2016.

http://www.boatcourse.com/BoatingInformation/01_BasicBoatingInformation/12_Trailers_and_Trailering.aspx, DuraSafe CC001 Coupler Connect Trailer Hitch Alignment Device, available before Feb. 26, 2016.

http://www.horseandman.com/category/handy-tips/page/5/, Preventing Trailer Accidents: Read this important article, available before Feb. 26, 2016.

http://www.mrtrailer.com/quickbite.htm, Quickbite has a coupler that guides the ball into itself and latches itself too, available before Feb. 26, 2016.

https://www.carid.com/reese/, Reese Trailer Hitches & Towing, available before Feb. 26, 2016.

https://www.youtube.com/watch?v=GwxVB4xbA5k, Hooking up a trailer in ten easy steps, published Apr. 25, 2015.

* cited by examiner

TWO-POINT HITCH MOUNT SYSTEMS

CROSS-REFERENCE TO RELATED APPLICATION

This application claims the benefit of U.S. Provisional Patent Application No. 62/300,481, filed Feb. 26, 2016, and U.S. Provisional Patent Application No. 62/338,553, filed May 19, 2016, both of which are incorporated herein by reference in their entirety.

FIELD OF THE DISCLOSURE

The field of the disclosure relates to two-point hitch mount systems for towing an implement and, in particular, systems that include a shaft portion that attaches to the tow vehicle before coupling the tow vehicle with a yoke assembly of the implement.

BACKGROUND

Many implements, such as mower conditioners, are operated by use of a tow vehicle (e.g., tractor) that propels and directs the implement through the field. Rotational power is provided to the implement through a driveline that attaches to the power-take-off ("PTO") shaft of the tow vehicle. Such implements may be pulled by use of a two-point linkage or a drawbar (FIGS. 1 and 2) connected to the tow vehicle. Attachment by use of the two-point linkages of the tow vehicle involves aligning both linkages which increases the difficulty of the attachment and may be slower than attachment by the drawbar alone.

A conventional drawbar system for connecting an implement 3 to a tow vehicle T is shown in FIGS. 1 and 2. As the tow vehicle T is steered, it pivots with respect to the implement 3 (shown as a rake frame) about a vertical pivot axis Y at which the drawbar 4 is pinned to the implement 3. The proximity of the pivot axis Y to the tow vehicle limits the pivotal range of the tow vehicle T relative to the implement 3. The drawbar 4 also does not allow the tow vehicle to pivot with respect to the implement about a roll axis as the tow vehicle and implement travel over uneven terrain.

A need exists for hitch mounts that couple to the two-point linkages of a tow vehicle, that are self-adjusting to simplify hitching, that utilize a minimum number of components and that are pivotable relative to the tow vehicle and the implement in order to minimize stress between the pulling vehicle and the implement during travel over uneven surfaces.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a two-point hitch mount system for attaching an implement to a tow vehicle having two hitch arms. The two-point hitch mount system comprises a shaft configured to be attached to the two hitch arms of the tow vehicle. The system also includes a yoke assembly having a first arm and a second arm. The first arm has a first shaft slot for removably receiving the shaft and a second shaft slot for removably receiving the shaft.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 3:
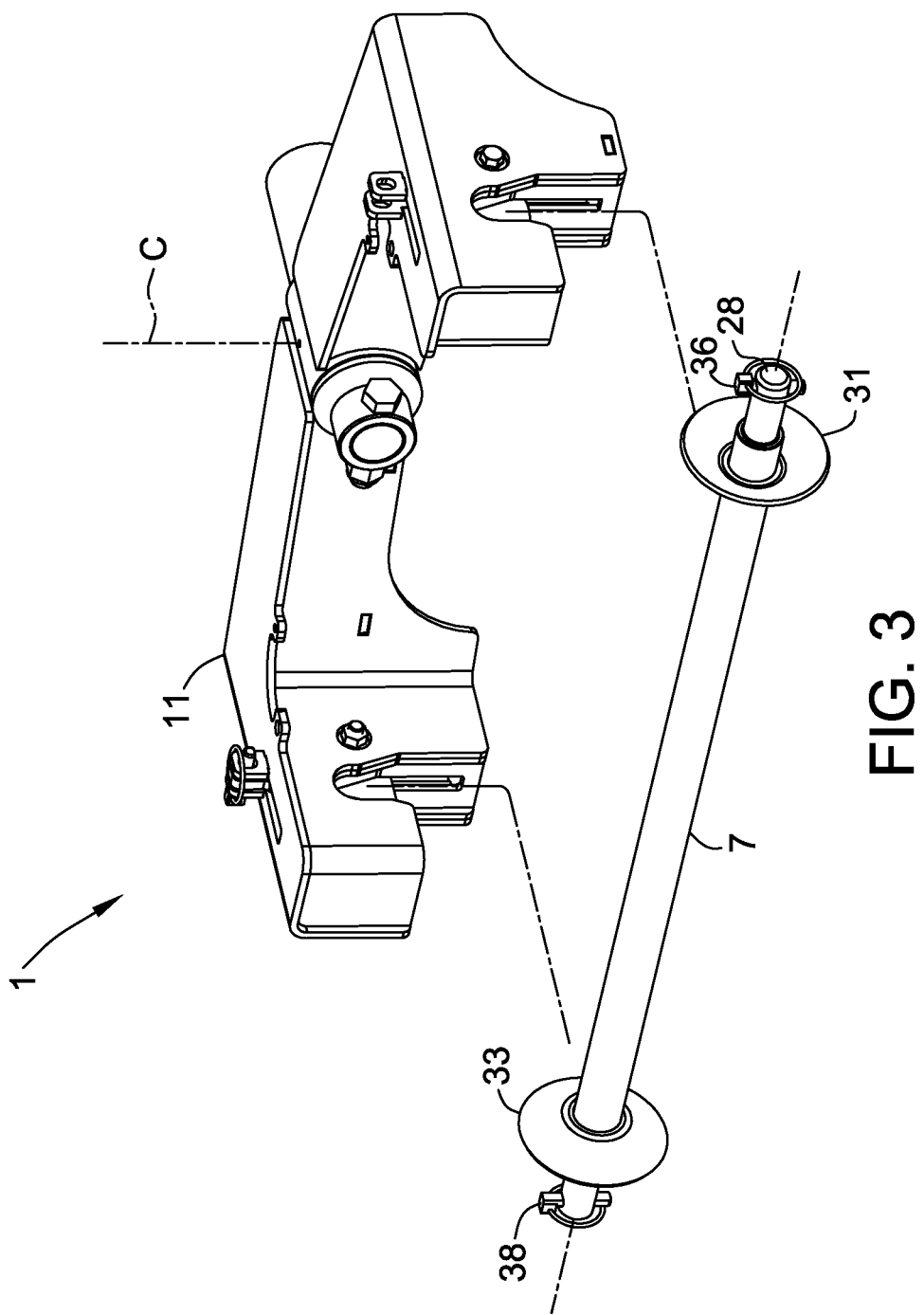
FIG. 3 is a perspective view of a two-point hitch mount system.
Figure 4:
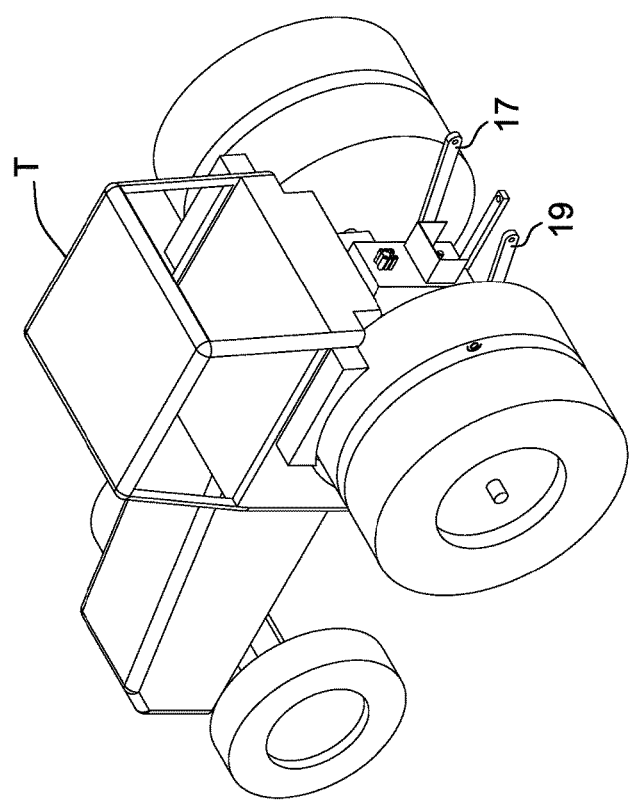
FIG. 4 is a perspective view of a tow vehicle.
Figure 14:
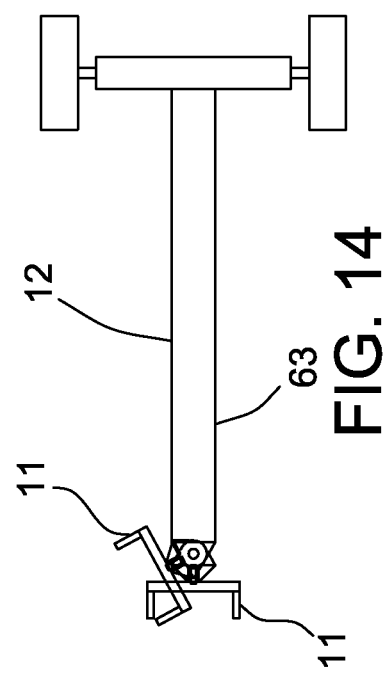
FIG. 14 is a schematic of an implement with the yoke assembly attached directly to the implement tongue and showing the yoke assembly in two different pivotal positions.

An embodiment of a two-point hitch mount system is generally referred to as "1" in FIG. 3. The two-point hitch mount system includes a shaft 7 which is configured to be attached to the two hitch arms 17, 19 of the tow vehicle (FIG. 4). Once attached, the tow vehicle and shaft are connected to a yoke assembly 11 which is connected to the implement 12 (FIG. 14). The two-point hitch mount system 1 includes a vertical axis C (FIG. 3) that is orthogonal to the shaft 7.

Figure 5:
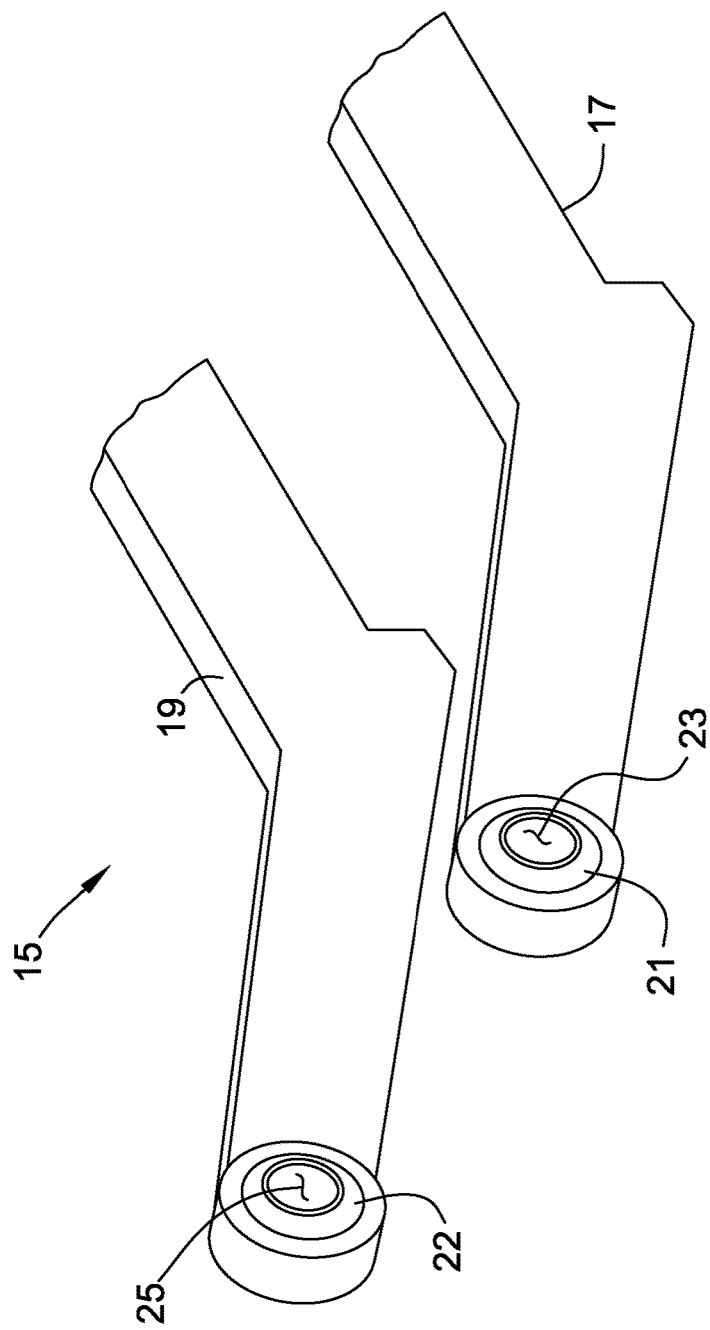
FIG. 5 is a perspective view of the two lower link arms of the tow vehicle.

An exemplary two-point hitch 15 of a tow vehicle (not shown) to which the shaft 7 (FIG. 3) may be attached is shown in FIG. 5. The two-point hitch 15 includes two lower link arms 17, 19 (which may simply be referred to herein as "hitch arms" or "arms") that each have a ball joint 21, 22 at its end. The link arms 17, 19 are typically raised and lowered by lift arms (not shown) of the tow vehicle. Each ball joint 21, 22 has an opening 23, 25 therein to couple the link arms 17, 19 to various implements. Generally, the two arms 17, 19 are the lower link arms of a three-point hitch assembly (or the two links of a two-point hitch) of the tow vehicle. The two arms 17, 19 that include the ball joints 21, 22 may be a single piece or may be two adapter segments that are removably attached to the lower link arms of the tow vehicle.

The shaft 7 is configured (i.e., sized and/or arranged) to be attached to the two hitch arms 17, 19 of the tow vehicle. The shaft 7 has a diameter (or a portion that has such a diameter) that is less than the diameter of the openings 23, 25 of the ball joints 21, 22 to allow the shaft 7 to be slid into the openings 23, 25 by the operator of the tow vehicle (FIG. 4). The shaft 7 has a length that allows the shaft to extend between the hitch arms 17, 19. Such dimensions may comply with the standards set forth in ISO 730:2009 entitled "Agricultural Wheeled Tractors—Rear-mounted three-point linkage—Categories 1, 2N, 2, 3N, 4N, 4."

The shaft 7 has a first end 28 (FIG. 7) and a second end 29 and a shaft axis A that extends through the first end 28 and the second end 29. The shaft 7 includes two lock-pin openings 30, 32 that receive lock-pins 36, 38 (FIG. 3) to prevent the shaft 7 from sliding out of the ball joints 21, 22. Two alignment disks 31, 33 are connected to the shaft 7 to assist in attaching the shaft 7 to the yoke assembly 11 (FIG. 3). In other embodiments, the two-point hitch mount system 1 does not include alignment disks 31, 33.

To attach the shaft 7 to the two arms 17, 19 of the tow vehicle, each end 28, 29 of the shaft 7 is slid into a ball joint 21, 22 such that each ball joint 21, 22 is between an alignment disk 31, 33 and a lock-pin opening 30, 32. After attaching the shaft 7 to the tow vehicle, the tow vehicle is directed to the implement having the yoke assembly 11 attached thereto.

Figure 8:
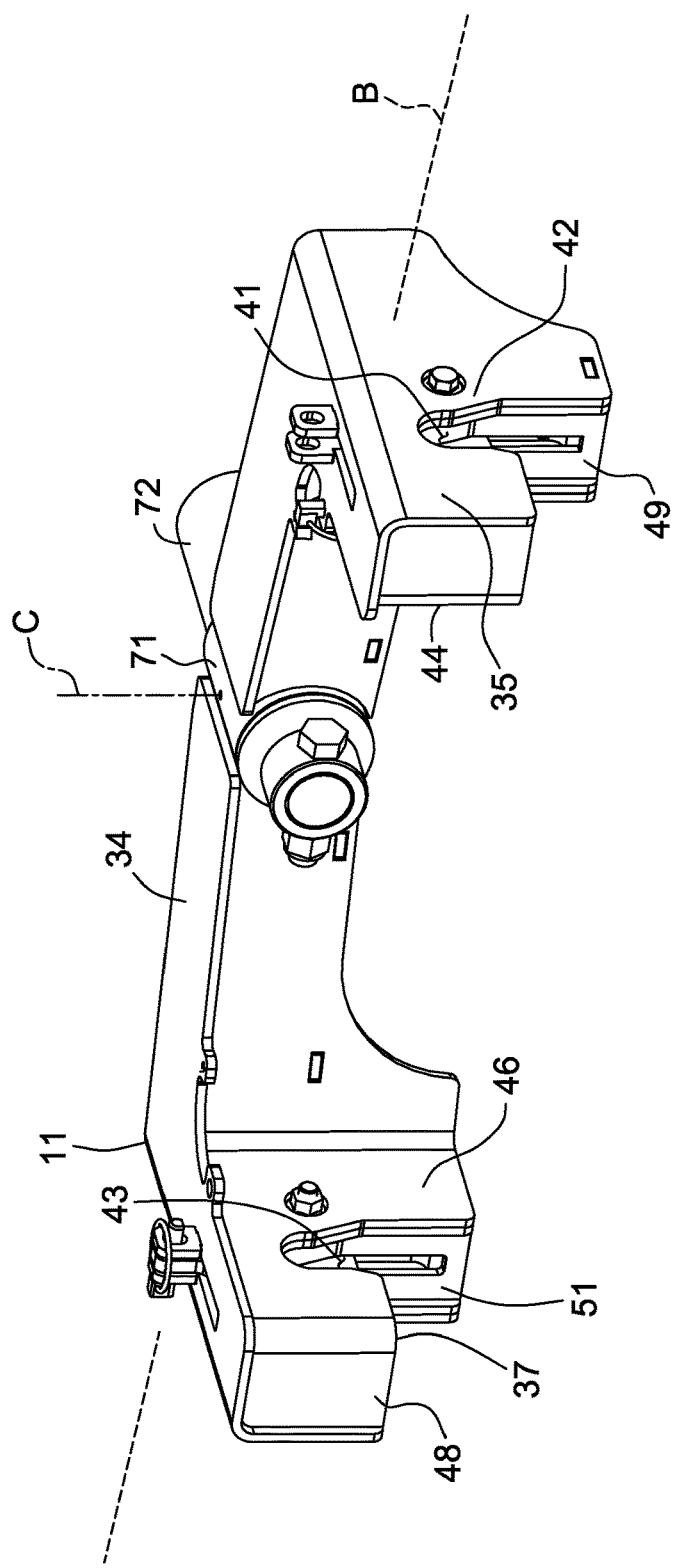
FIG. 8 is a perspective view of the yoke assembly of the hitch mount system.
Figure 9:
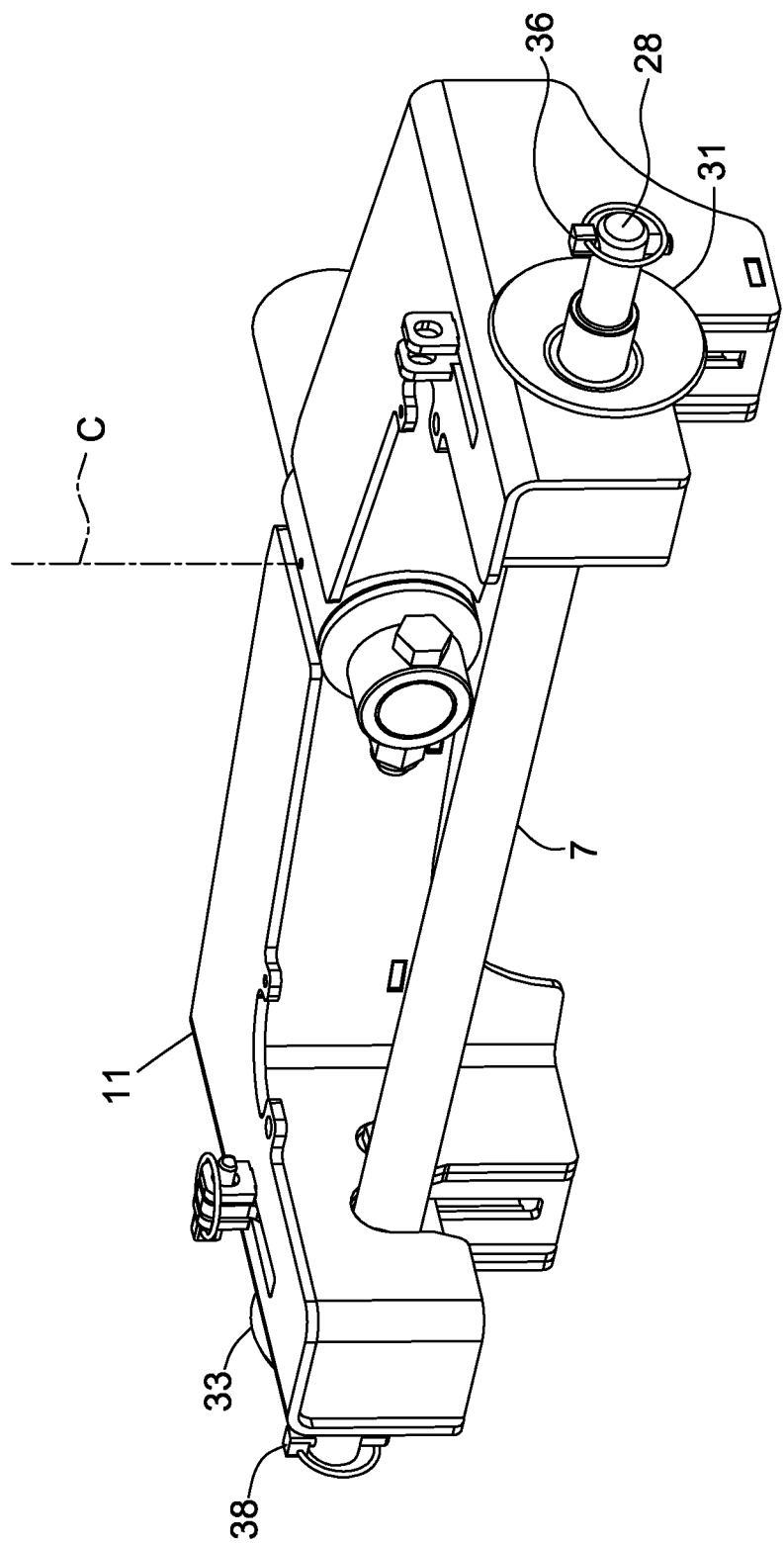
FIG. 9 is a perspective view of the hitch mount system with the shaft coupled to the yoke assembly.
Figure 12:
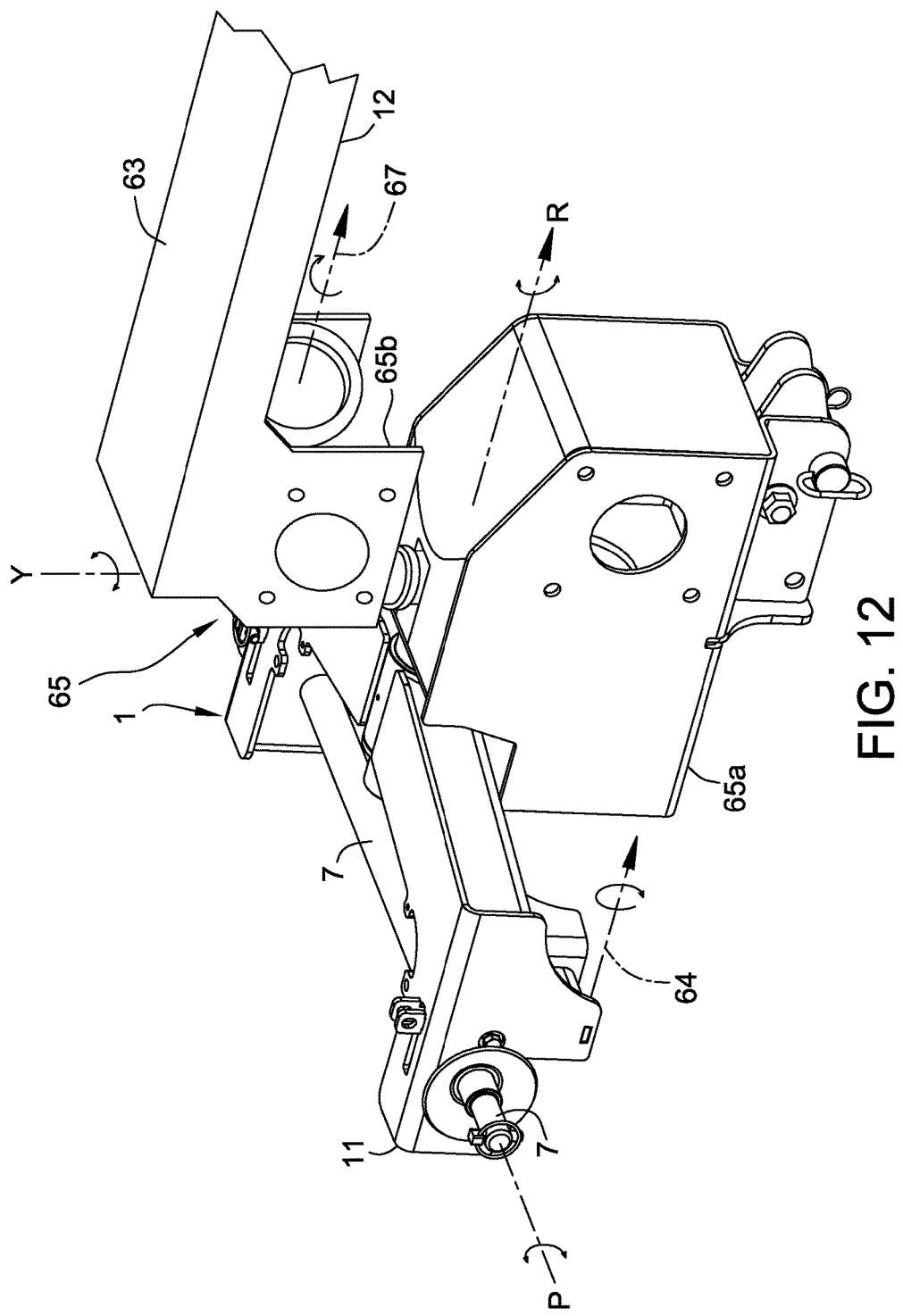
FIG. 12 is a perspective view of the hitch mount system attached to a swivel gearbox of the implement.
Figure 13:
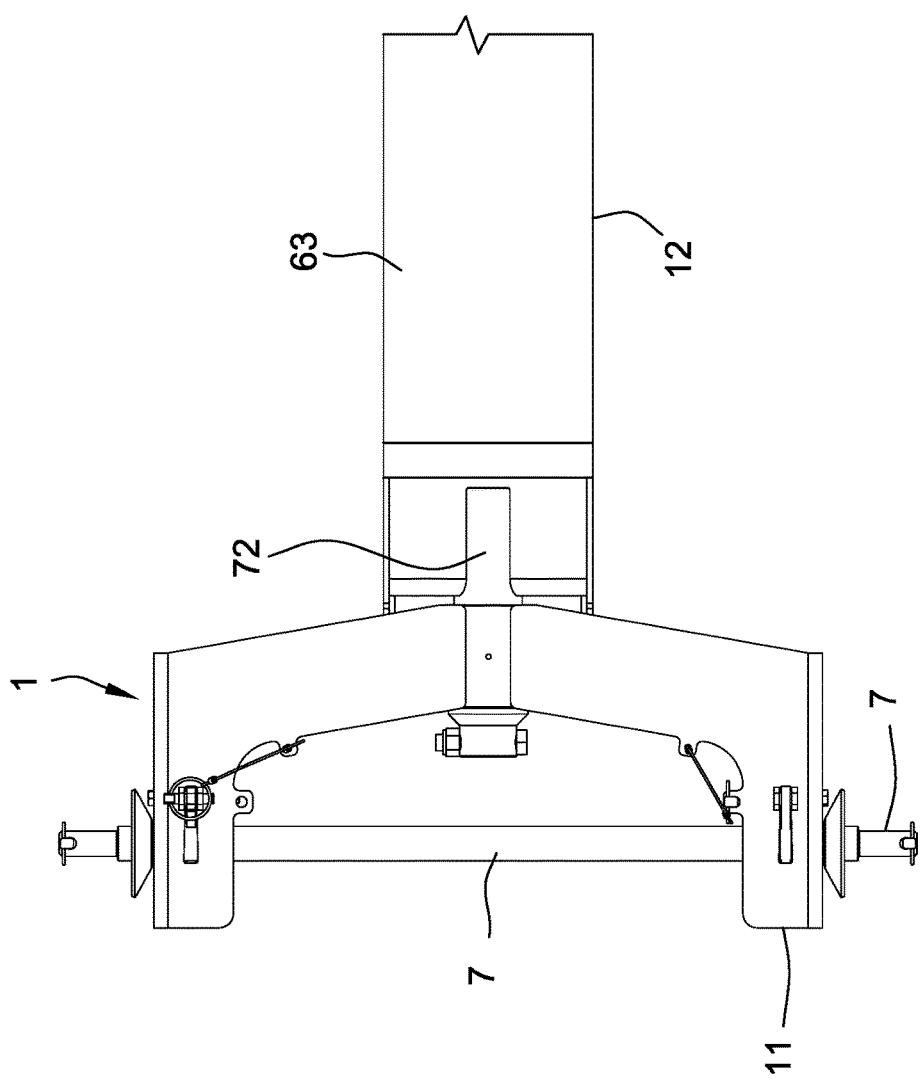
FIG. 13 is a perspective view of the hitch mount system attached to a swivel gearbox of the implement.

The shaft 7 is attachable to a yoke assembly 11 (FIG. 8). The yoke assembly 11 may be part of an agricultural implement such as a wheel rake 12 (FIG. 14 with the rake frame being shown) or a mower conditioner having a swivel gearbox 65 (FIG. 12).

Figure 7:
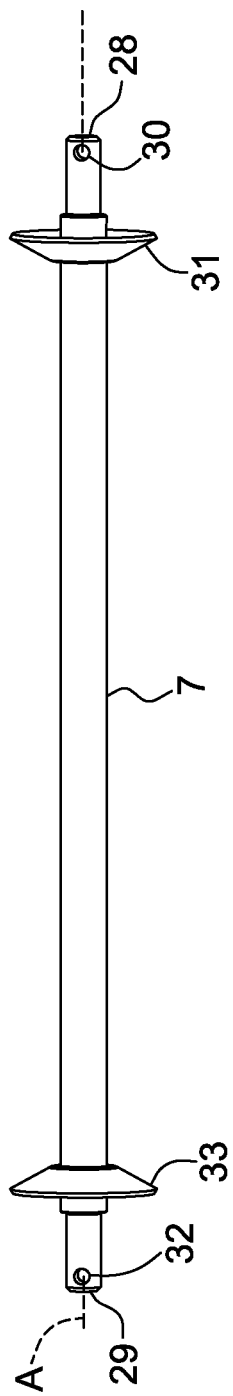
FIG. 7 is a front view of the shaft of the hitch mount system.

The yoke assembly 11 (FIG. 8) includes a main body portion 34 that has a lateral axis B that is parallel to the shaft axis A (FIG. 7) when the shaft 7 is attached to the yoke assembly 11. The yoke assembly 11 also includes a first arm 35 and a second arm 37 that extend forward (i.e., toward the tow vehicle) from the main body portion 34. The first arm 35 includes a first shaft slot 41 for removably receiving the shaft 7 (FIG. 7). The first shaft slot 41 is formed between a first arm base portion 42 and a first arm forward projection 44. As shown in FIG. 8, the base portion 42 extends below the first arm forward projection 44 relative to the vertical axis C to form a first stop 49 for contacting the shaft 7 (FIG. 7) as the tow vehicle moves toward the implement (i.e., the first shaft slot 41 is above the first stop 49 with respect to the vertical axis C).

The second arm 37 includes a second shaft slot 43 that also removably receives the shaft 7 (FIG. 7). The second shaft slot 43 is formed between a second arm base portion 46 and a second arm forward projection 48. The second arm base portion 46 extends below the second arm forward projection 48 to form a second stop 51 for contacting the shaft 7 (FIG. 7) as the tow vehicle moves toward the implement (i.e., the second shaft slot 43 is above the second stop 51 with respect to the vertical axis C).

To couple the shaft 7 and tow vehicle to the yoke assembly 11, the hitch arms 17, 19 of the tow vehicle are vertically aligned with the stops 49, 51 by the operator of the tow vehicle. The tow vehicle moves toward the yoke assembly 11 to cause the shaft 7 to contact the first stop 49 and the second stop 51. The yoke assembly 11 self-aligns as described below and the hitch arms 17, 19 are then raised to position the shaft 7 in the slots 41, 43 (FIG. 10).

Figure 10:
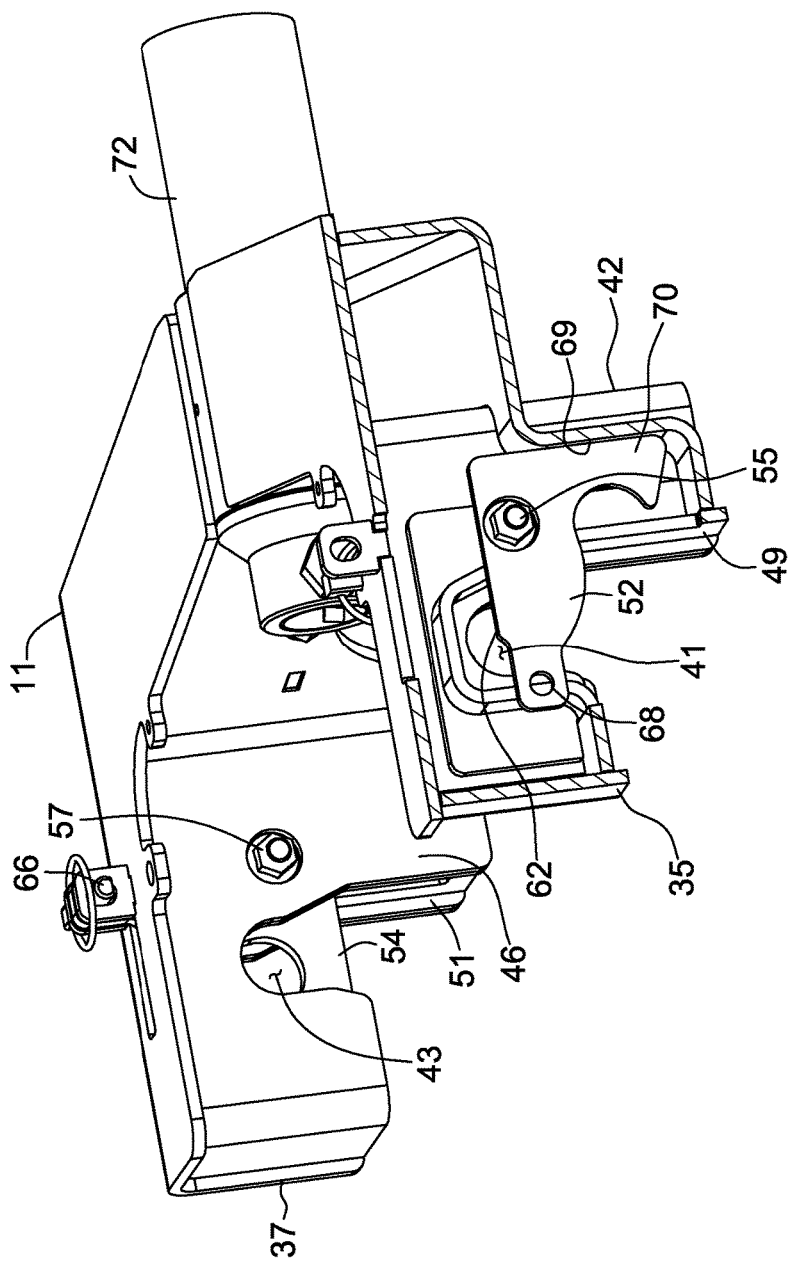
FIG. 10 is a perspective cross-section view of the hitch mount system showing one latch in the resting position and one latch in the locked position.

Referring now to FIG. 10, the two-point hitch mount system 1 includes a first latch 52 for securing the shaft 7 in the first shaft slot 41 and a second latch 54 for securing the shaft 7 in the second shaft slot. For illustration, the first latch 52 is shown in its resting position before the shaft is coupled to the yoke assembly 11 and the second latch is shown in its locked position after the shaft 7 has been attached. Typically both the first and second latches 52, 54 will be in the same position—the resting position of the first latch 52 or the locked position of the second latch 54.

The first latch 52 pivots about a pin 55 in the base portion 42 of the first arm 35, and the second latch pivots about a pin 57 in the base portion 46 of the second arm 37. With reference to the first latch 52, each latch 52, 54 includes a leg portion 62 and a fastening portion 70. Once the shaft 7 has contacted the stops 49, 51 of the first and second arms 35, 37 and is raised to engage the slots 41, 43, the shaft 7 contacts the leg 62 of each latch 52, 54. The shaft 7 pushes the leg 62 of each latch 52, 54 upward which causes each latch to pivot about pin 55, 57 and for the fastening portion 70 of the latch to surround the shaft 7. In this position, a lock-pin 66 may be received in a lock-pin opening 68 of each latch to secure the latch 52, 54 in the locked position.

To decouple the shaft 7 from the yoke assembly 11, the lock-pins 66 are removed from each latch 52, 54 and the shaft 7 is lowered. Gravity and/or downward movement of the shaft 7 causes each latch 52, 54 to pivot to cause the fastening portion to recede within the first and second stops 49, 51 of each arm 35, 37. Upon removal of the shaft 7, the latches 52, 54 remain in their resting position (i.e., the position of latch 52 in FIG. 10) to allow for subsequent connection of the shaft 7 and the yoke assembly 11. The latches 52, 54 remain in the resting position due to the position of the center of mass of the latch (i.e., the center of mass is in the leg portion 62 to hold the leg portion 62 down and the fastening portion 70 within the arm of the yoke assembly 11). Each arm 35, 37 may also have a ledge 69 which contacts the fastening portion 70 of each latch 52, 54 to prevent further rotation of the latches 52, 54. Alternatively or in addition, a biasing mechanism, such a spring, could be associated with each of the latches 52, 54 to bias the latches 52, 54 in their resting (non-deployed) position.

Figure 11:
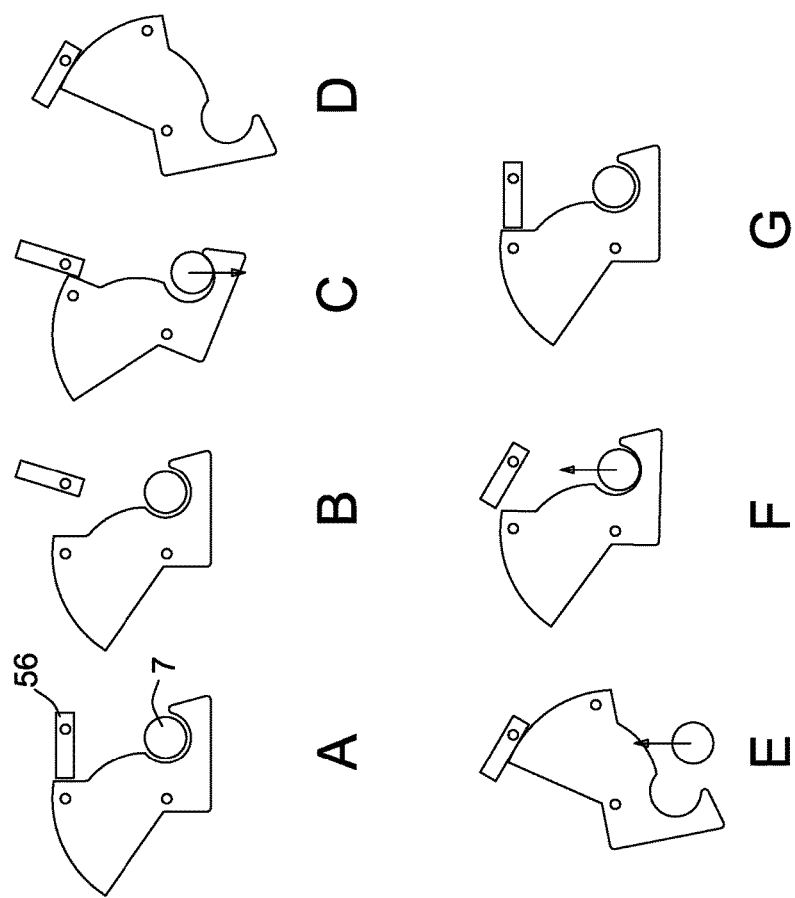
FIG. 11 is a perspective view of an alternative latch system.

An alternative latch system which uses gravity to automatically lock is shown in FIG. 11. The latch includes a pivotable lock 56. The lock 56 is in a locked position in FIG. 11A. The lock 56 is disengaged as shown in FIG. 11B by the operator and the shaft is lowered as shown in FIGS. 11C and 11D. During attachment of the shaft 7, the latch and lock 56 move to the locked position as shown in FIGS. 11E to 11G.

The two-point hitch mount system 1 may be pivotally attached to the implement. The yoke assembly 11 includes a bushing 71 (FIG. 8) that rotates about a mounting pin 72 that is attached to the implement.

The implement typically includes a driveline that transfers power from the PTO drive assembly of the tow vehicle to a powered element of the implement. The PTO driveline of the implement connects the PTO shaft of the tow vehicle and a component mounted to the frame of the implement. The PTO driveline may be a telescoping assembly with universal joints and shielding that allows relative movement between the tow vehicle and the implement that is typical with mobile operation. In some embodiments and is shown in FIG. 12, a gearbox assembly 65 mounted on the implement may be used to provide angular movement within the PTO driveline.

As shown in FIG. 12, power from the PTO shaft of the tow vehicle is transferred through the driveline of the implement along a PTO driveline (not shown) that extends from the tow vehicle along axis 64, into the swivel gearbox 65, and implement drive shaft that extends along axis 67. The two-point hitch mount system 1 is connected to the housing of a lower portion 65*a* of the swivel gearbox 65 and the PTO driveline is attached to the input shaft of the lower portion 65*a* of the gearbox 65. The lower portion 65*a* of the gearbox 65 is attached to the upper portion 65*b* of the gearbox by a vertical drive shaft. The housing of the upper portion 65*b* of the swivel gearbox 65 is attached to the tongue 63 of the implement while the output shaft of the upper portion 65*b* of the gearbox 65 is attached to the implement driveshaft.

The swivel gearbox 65 allows the PTO driveline to remain approximately straight, as the angular deviation between the tow vehicle and the implement occurs at the axis of the vertical shaft of the swivel gearbox. This allows the angular deviation between the components of the driveline to occur as the lower gearbox 65*a* pivots about the axis of the vertical shaft.

The two lower link arms 17, 19 (FIG. 5) of the tow vehicle are free to pivot about the shaft 7 of the hitch mount system 1 about a pivot axis P (rotation being shown by the directional arrow in FIG. 12) allowing the implement to pivot relative to the tow vehicle when traversing terrain that has vertical deviations along the path of travel. The two-point hitch mount system 1 is free to pivot about a second pivot axis R relative to the swivel gearbox 65. The second pivot axis R passes through the mounting pin 72 (FIG. 8) and is offset 900 from the pivot axis P that passes through the shaft 7. The second pivot axis R is generally directionally aligned with the direction of travel of the tow vehicle and the implement. This pivot allows the implement to pivot relative to the tow vehicle when traversing terrain with vertical deviations lateral to the path of travel, for instance in situations where the implement (e.g., mower) may be higher or lower than the tow vehicle when shifted to the left or right of the tow vehicle and/or when the terrain on which the tow vehicle is located is angled differently than that of the implement.

The lower portion 65*a* of the swivel gearbox 65, along with the two-point hitch mount system 1, pivots about an axis Y (rotation being shown by the directional arrow) relative to the upper portion 65*b* of the swivel gearbox. The pivot axis Y is perpendicular to pivot axis R and is generally vertical. This pivot arrangement allows the two-point hitch mount system 1 to pivot relative to the tongue 63 of the implement. The pivot between the lower portion 65*a* and upper portion 65*b* of the swivel gearbox 65 allows the tow vehicle to freely turn during travel. In addition, this pivot allows the yoke assembly 11 to self-align while coupling with the shaft 7 and tow vehicle. As shown in FIG. 12, the pivot axis R about which the hitch mount system 1 pivots is orthogonal to the shaft pivot axis P. The pivot axis R is generally horizontal and intersects or is above the shaft pivot axis P. The pivot axes P, R and Y together generally facilitate the pivoting/swiveling of the two-point hitch mount system 1 in any or all of the X, Y, and Z directions.

Figure 1:
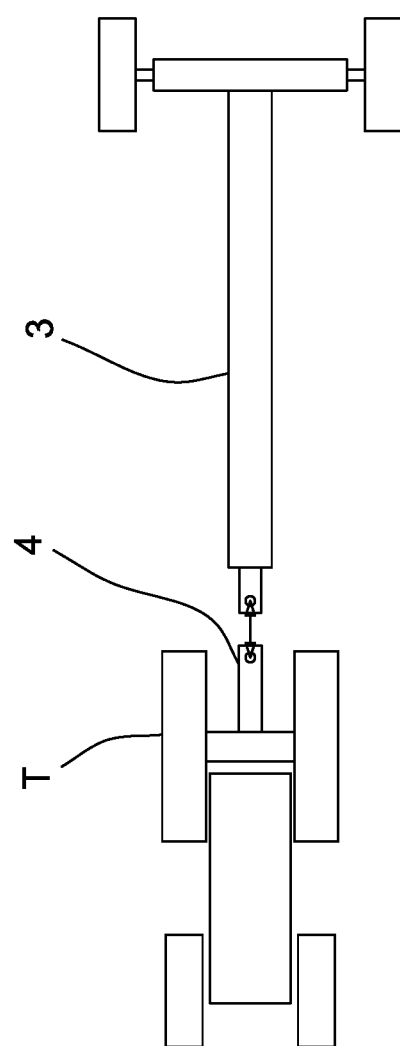
FIG. 1 is a schematic of a tow vehicle and implement with the tow vehicle being conventionally attached to the implement by the tow vehicle draw bar.
Figure 2:
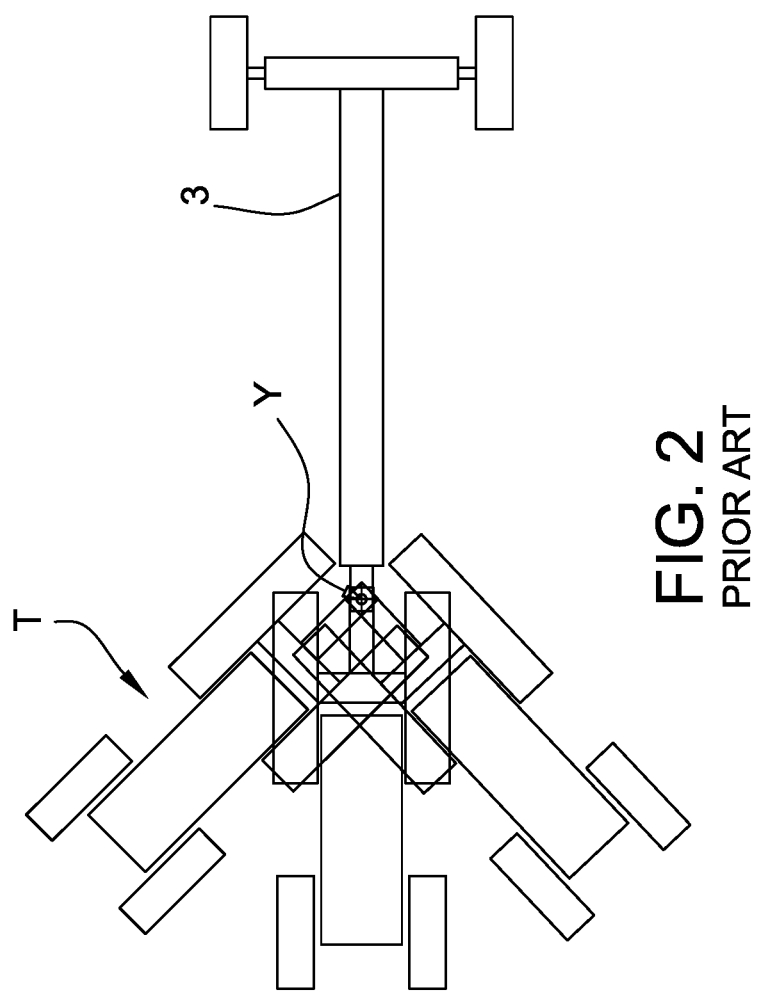
FIG. 2 is a schematic of the tow vehicle and implement of FIG. 1 showing the pivotal range of the tow vehicle about a vertical axis.
Figure 15:
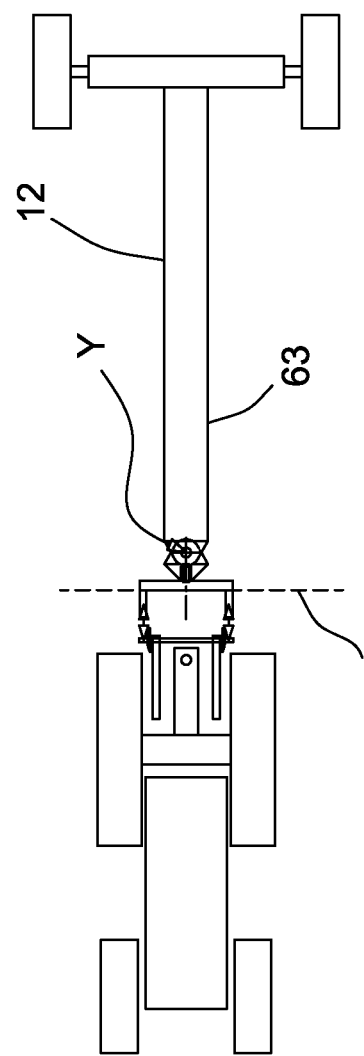
FIG. 15 is a schematic of the implement of FIG. 14 and a tow vehicle.
Figure 16:
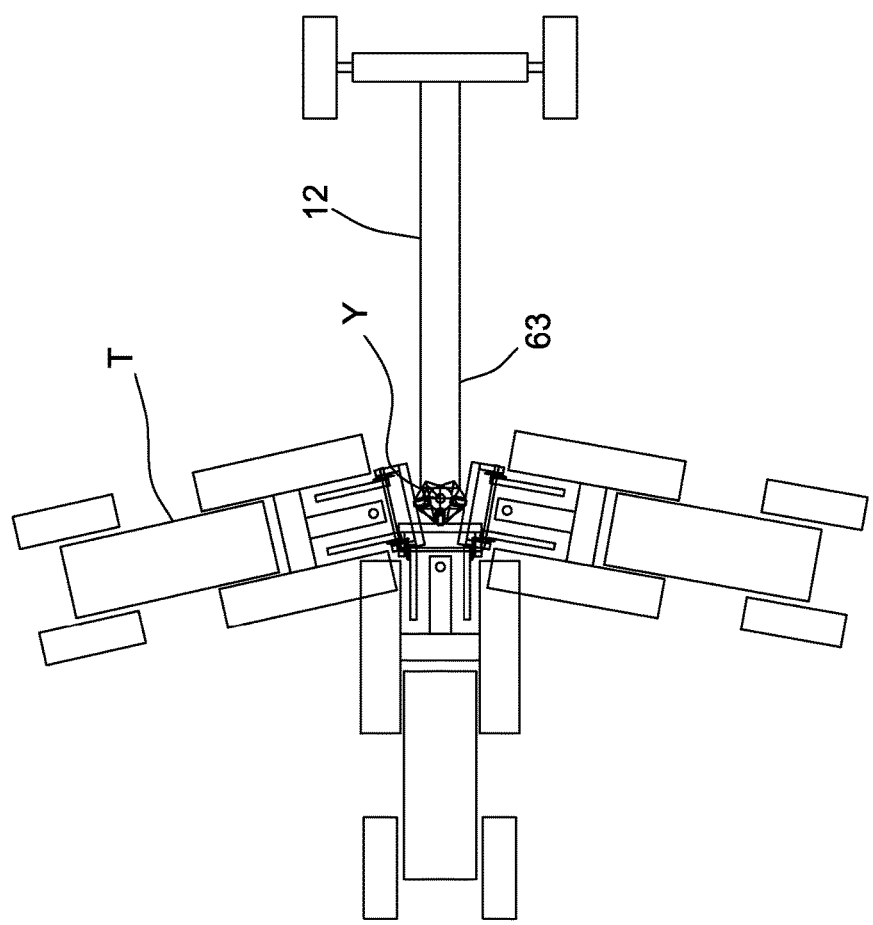
FIG. 16 is a schematic of the tow vehicle and implement of FIG. 15 showing the pivotal range of the tow vehicle about a vertical pivot axis.

In some embodiments and as shown in FIG. 14, the swivel gearbox 65 is eliminated and the yoke assembly 11 is attached directly to a tongue 63 of the implement, typically in a manner that allows the yoke assembly to pivot relative to the implement about pivot axis Y (FIG. 15). As shown in FIG. 16, as compared to a conventional drawbar arrangement (FIGS. 1 and 2) the yoke assembly 11 allows the pivot axis Y to be moved further away from the tow vehicle T which increases the pivotal range of the tow vehicle T relative to the implement 12.

The two-point hitch mount system 1 may be used to pull a variety of towable or movable implements including, but not limited to agricultural implements such as forage rakes (e.g., forage rakes, mowers and mower conditioners, peanut harvesters, etc.).

Figure 6:
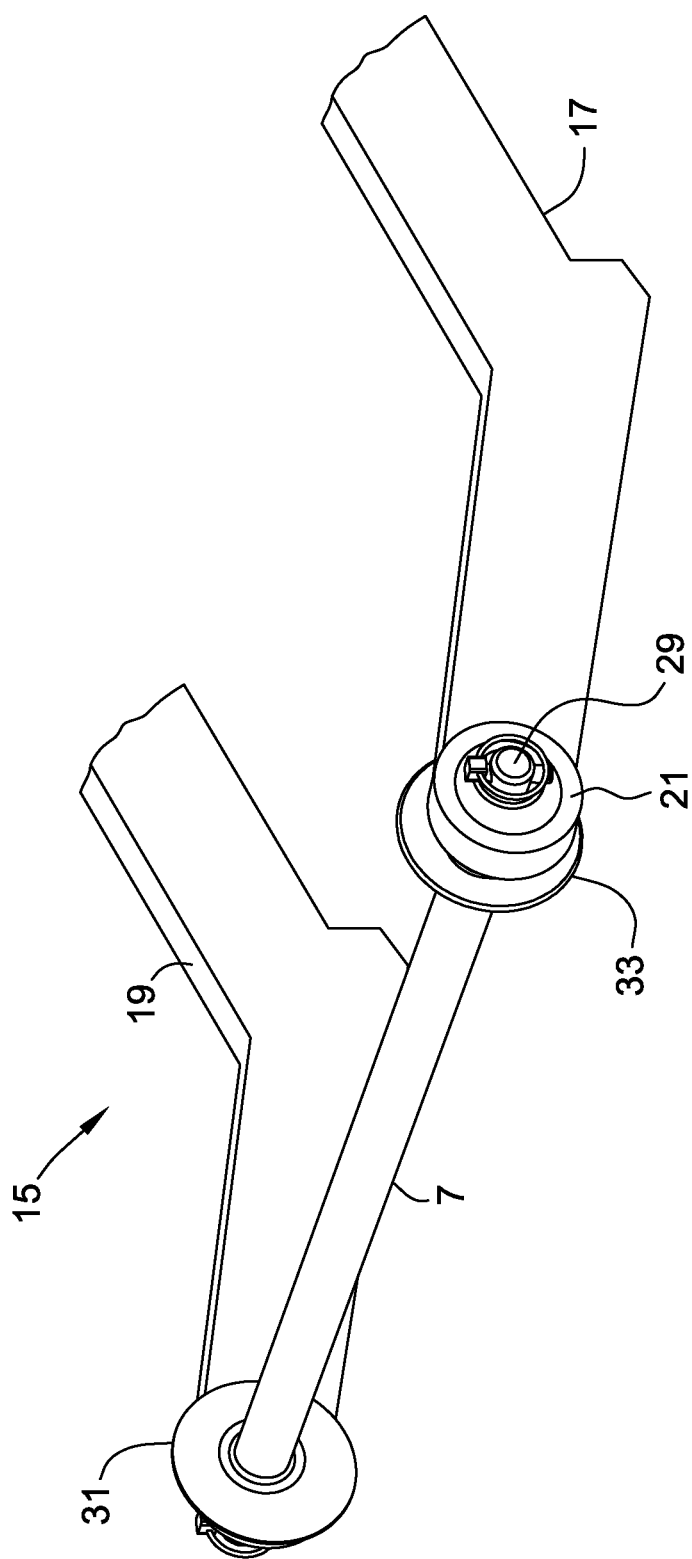
FIG. 6 is a perspective view of the two lower link arms connected to a shaft of the hitch mount system.

To attach the tow vehicle to the implement, an operator first attaches the shaft 7 (FIG. 6) to the lower link arms 17, 19 of the tow vehicle. The tow vehicle and shaft 7 are moved toward the yoke assembly 11 (FIG. 8). The hitch arms 17, 19 are vertically adjusted (typically hydraulically adjusted from the tow vehicle by the operator) to allow the shaft 7 to contact the stops 49, 51 (FIG. 8) of the yoke assembly 11 while the tow vehicle approaches the yoke assembly 11. If the yoke assembly 11 is not laterally aligned with the shaft 7, the shaft 7 contacts at least one stop 49, 51, which causes the yoke assembly 11 and lower portion 65*a* of the swivel gearbox 65 to rotate relative to the upper portion 65*b* of the swivel gearbox 65 and align with the shaft 7. The shaft 7 then contacts the other stop 49, 51 (if not already contacting both), and the shaft 7 and hitch arms 17, 19 may be raised. The shaft 7 contacts the leg portion 62 of the latches 52, 54 (FIG. 10) and forces the latches 52, 54 to pivot and for the fastening portions 65 of the latches 52, 54 to surround the shaft 7. Once the shaft 7 is fully received is the slots 41, 43 (FIG. 10) (i.e., contacts or is near the top of the slots 41, 43 and/or the implement is lifted), the operator may insert lock pins 66 in the latches 52, 54.

To disengage the tow vehicle from the implement, the lock pins 66 in the latches 52, 54 are removed. The hitch arms 17, 19 and shaft 7 are lowered causing the shaft to disengage the latches 52, 54 and the latches 52, 54 to pivot toward their resting position. Upon lowering the shaft 7 below the slots 41, 43 of the first and second arms 35, 37, the tow vehicle is then moved forward away from the implement.

Compared to conventional mounting systems, the hitch mount system described above has several advantages. The mount system allows the implement to be attached to the two lower link arms of the tow vehicle. The lower link arms may be vertically adjusted from the tow vehicle which allows the tow vehicle to connect to the implement without adjustment of the implement tongue height. The two-point hitch mount system may self-align upon the shaft contacting even a single stop by pivoting around the pivot axis that extends through the swivel gearbox. Upon lifting, the yoke assembly also becomes self-aligned upon contact of the shaft with the top portion of one of the arm slots. In embodiments in which alignment disks are attached to the shaft, the yoke assembly aligns laterally with the shaft upon raising the lower link arms. The alignment disks also constrain movement of the shaft laterally with respect to the yoke assembly. By positioning the pivot point of the latches behind the slots, the latches are inclined to rest in a position in which the shaft may be reattached to the yoke assembly after decoupling of the shaft (i.e., the latches reset to a position in which the fastening portion of the latches recedes past the stop surfaces and into the yoke assembly which allows the shaft to subsequently enter the slots without the operator moving the latches). The pivot of the latch into its resting position can be caused by gravity or by the downward movement of the shaft during disengagement.

Compared to drawbar systems, the yoke assembly allows the vertical pivot axis formed with the tow vehicle to be further separated from the tow vehicle which increases the pivotal range of the tow vehicle relative to the implement. In some embodiments, the tow vehicle may also pivot about a roll axis R (FIG. 12) relative to the implement when the tow vehicle and implement travel over uneven terrain.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A movable implement attachable to a tow vehicle, the implement comprising:
   a two-point hitch mount system for attaching the implement to a tow vehicle having two hitch arms, the two-point hitch mount system comprising:
      a shaft configured to be attached to the two hitch arms of the tow vehicle, the shaft having a first end, a second end and a shaft axis that extends through the first end and the second end; and
      a yoke assembly having a first arm and a second arm, the first arm having a first shaft slot for removably receiving the shaft and the second arm having a second shaft slot for removably receiving the shaft, the yoke assembly having a horizontal pivot axis, the yoke assembly horizontal pivot axis being perpendicular to the shaft axis;
   a swivel that allows the yoke assembly to pivot relative to the implement about a vertical pivot axis; and
   a tongue.

2. The movable implement as set forth in claim 1 wherein the swivel is disposed within a swivel gearbox, the tongue being attached to the swivel gearbox, the yoke assembly being pivotally connected to the swivel gearbox.

3. The movable implement as set forth in claim 2 wherein the swivel gearbox has a lower portion and an upper portion, the yoke assembly being pivotally connected to the lower portion of the swivel gearbox and the tongue being connected to the upper portion of the swivel gearbox.

4. The movable implement as set forth in claim 3 in combination with the tow vehicle, the two hitch arms of the tow vehicle being attached to the shaft.

5. The movable implement as set forth in claim 2 wherein the swivel gearbox is directly connected to a tongue of the implement.

6. The movable implement as set forth in claim 5 wherein the swivel gearbox is pivotally connected to the tongue.

7. The movable implement as set forth in claim 1 wherein the yoke assembly is attached directly to the tongue.

8. A two-point hitch mount system for attaching an implement to a tow vehicle having two hitch arms, the two-point hitch mount system comprising:
   a shaft configured to be attached to the two hitch arms of the tow vehicle;
   a yoke assembly having a first arm and a second arm, the first arm having a first shaft slot for removably receiving the shaft and the second arm having a second shaft slot for removably receiving the shaft;
   a first stop for contacting the shaft as the tow vehicle moves toward the implement;
   a second stop for contacting the shaft as the tow vehicle moves toward the implement;
   a first latch for securing the shaft in the first shaft slot, the first latch being pivotally attached to the first arm, the first latch receding within the first stop when released or pushed downward by the shaft to allow for subsequent connection of the shaft into the first slot; and
   a second latch for securing the shaft in the second shaft slot, the second latch being pivotally attached to the second arm, the second latch receding within the second stop when released or pushed downward by the shaft to allow for subsequent connection of the shaft into the second slot.

9. The two-point hitch mount system as set forth in claim 8 wherein the two-point hitch mount system has a vertical axis, the first shaft slot being above the first stop with respect to the vertical axis and the second shaft slot being above the second stop with respect to the vertical axis.

10. The two-point hitch mount system as set forth in claim 9 wherein:
    the first arm comprises a first arm base portion and a first arm forward projection, the first shaft slot being formed between the first arm base portion and the first arm forward projection, the first arm base portion forming the first stop; and
    the second arm comprises a second arm base portion and a second arm forward projection, the second shaft slot being formed between the second arm base portion and the second arm forward projection, the second arm base portion forming the second stop.

11. The two-point hitch mount system as set forth in claim 8 wherein the first latch and second latch each include an opening for receiving a lock pin.

12. The two-point hitch mount system as set forth in claim 8 wherein the shaft includes a first end, a second end and a shaft axis that extends through the first end and the second end, the yoke assembly comprising a main body portion that has a lateral axis that is parallel to the shaft axis when the shaft is received in the first shaft slot and the second shaft slot, the first arm and the second arm each extending forward from the main body portion.

13. A movable implement attachable to a tow vehicle, the implement comprising the two-point hitch mount system as set forth in claim 8, the yoke assembly being pivotally attached to the implement.

14. The movable implement as set forth in claim 13 wherein the shaft includes a first end, a second end and a shaft axis that extends through the first end and the second end, the yoke assembly having a pivot axis, the yoke assembly pivot axis being perpendicular to the shaft axis.

15. A two-point hitch mount system for attaching an implement to a tow vehicle having two hitch arms, the two-point hitch mount system comprising:
- a shaft configured to be attached to ball joints of the two hitch arms of the tow vehicle, the shaft including a first end, a second end and a shaft axis that extends through the first end and the second end;
- a yoke assembly comprising:
  - a main body portion;
  - a first arm extending forward from the main body portion and having a first shaft slot for removably receiving the shaft;
  - a second arm extending forward from the main body portion and having a second shaft slot for removably receiving the shaft, the main body portion having a lateral axis that is parallel to the shaft axis when the shaft is received in the first shaft slot and the second shaft slot.

16. The two-point hitch mount system as set forth in claim 15 comprising at least two lock-pin openings for removable receiving a lock pin to secure the shaft within the ball joints of the two hitch arms.

17. The two-point hitch mount system as set forth in claim 15 comprising:
- a first stop for contacting the shaft as the tow vehicle moves toward the implement; and
- a second stop for contacting the shaft as the tow vehicle moves toward the implement.

18. The two-point hitch mount system as set forth in claim 17 comprising:
- a first latch for securing the shaft in the first shaft slot; and
- a second latch for securing the shaft in the second shaft slot.

19. The two-point hitch mount system as set forth in claim 18 wherein the first latch is pivotally attached to the first arm and the second latch is pivotally attached to the second arm, the first latch receding within the first stop when released or pushed downward by the shaft to allow for subsequent connection of the shaft into the first slot and the second latch receding within the second stop when released or pushed downward by the shaft to allow for subsequent connection of the shaft into the second slot.

* * * * *